United States Patent [19]

Ewan et al.

[11] Patent Number: 5,346,778
[45] Date of Patent: Sep. 13, 1994

[54] ELECTROCHEMICAL LOAD MANAGEMENT SYSTEM FOR TRANSPORTATION APPLICATIONS

[75] Inventors: James M. Ewan, Palm Beach Gardens; Steven M. Misiasxek, Tequesta; Donald P. Alessi, Jr., Lake Park, all of Fla.

[73] Assignee: Energy Partners, Inc., West Palm Beach, Fla.

[21] Appl. No.: 929,618

[22] Filed: Aug. 13, 1992

[51] Int. Cl.$^5$ .............................................. H01M 8/18
[52] U.S. Cl. ......................................... 429/19; 429/17;
429/21; 429/24; 429/25; 204/DIG. 4
[58] Field of Search ....................... 429/13, 21, 24, 25,
429/17; 204/DIG. 4, 267; H01M 8/02

[56] References Cited

U.S. PATENT DOCUMENTS 4,657,829  4/1987  McElroy et al. .................... 429/19
4,988,580  1/1991  Ohsaki et al. ....................... 429/19

Primary Examiner—Kathryn Gorgos
Attorney, Agent, or Firm—Paul J. Sutton; Barry G. Magidoff

[57] ABSTRACT

A load management system for hydrogen-oxygen fuel cells is provided, for powering vehicles. The load management system operates such that under normal load conditions air is provided as the oxidizing agent for the hydrogen fuel. At high output conditions the air supply is enriched with additional oxygen. The system comprises means responsive to the amperage output from the fuel cell stack to activate valve means for the addition of pure oxygen into the air inlet line. There is also provided means for electrolyzing water to produce pure hydrogen and pure oxygen gas, which may be recyclable to the fuel cell.

19 Claims, 4 Drawing Sheets

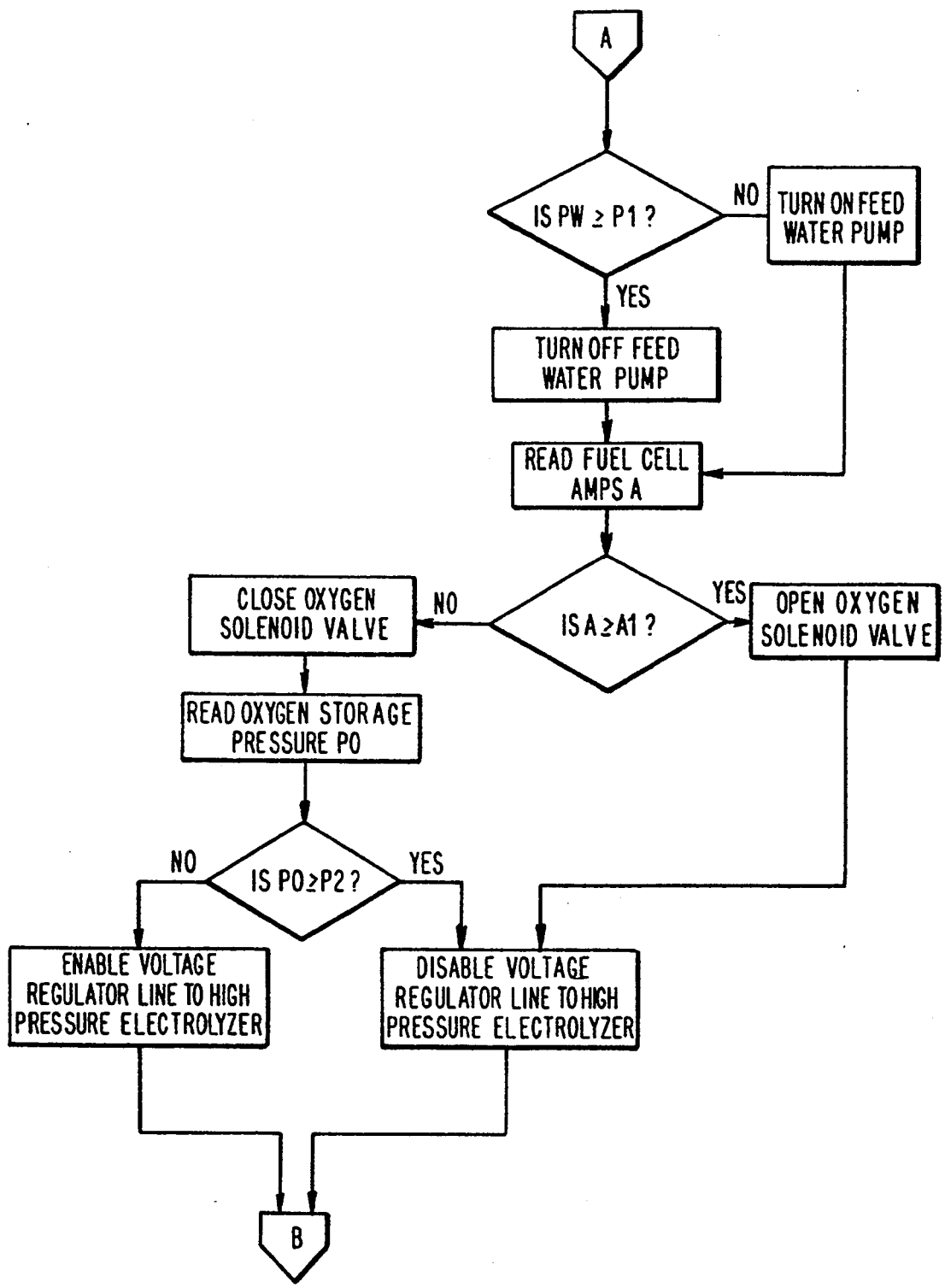
FIG. 3CONT'D

ELECTROCHEMICAL LOAD MANAGEMENT SYSTEM FOR TRANSPORTATION APPLICATIONS

This invention relates generally to an electrochemical, or fuel cell system, especially adapted for transportation applications, i.e., land vehicles. More specifically, this invention is directed to a low temperature, air-oxygen/hydrogen fuel cell having means for providing for surges of peak power output, on demand, as when acceleration is required. More particularly, this invention provides for a hydrogen-air fuel cell system which provides for the oxygen-enrichment of the air to the fuel cell in response to peak power requirements, as during acceleration.

BACKGROUND OF THE INVENTION

A fuel cell is a galvanic device which operates in accordance with similar electrochemical principles as in conventional storage batteries, i.e., a positive and negative electrode are separated by an ion-conducting electrolyte adapted to carry current generated by a catalyzed chemical reaction. Unlike the storage battery, however, the fuel cell has a theoretically infinite energy output capacity, dependent solely upon the continuous supply of fuel and oxidant to the reaction system. For the traditional hydrogen-oxidant fuel cell, current flow is provided by the flow of electrons associated with the passage of a positive hydrogen ion through an intervening electrolyte medium to the cathode in the oxygen-containing chamber of each cell, resulting in the formation of water and the generation of electric current. The energy value of the thus generated current, i.e., the potential energy of the voltage drop, is directly proportional to the energy output resulting from the exothermic oxidation reaction of hydrogen and the oxygen (in the air) to form water. Fuel cells, generally, have one common limitation: the voltage output of a cell decreases with increasing current flow, or amperage, i.e., as the power being drawn from the cell increases.

In the past, there have generally been three distinct types of hydrogen-oxygen fuel cells which are capable of operating at temperatures below about 500° F.: the solid polymer proton exchange membrane fuel cell; the alkaline fuel cell; and the phosphoric acid fuel cell. Each of these types are generally well known and further description is not needed for this invention. In general, however, it is the solid polymer proton exchange membrane fuel cell which will be most effective in the present invention. In these preferred fuel cells, electrical energy is produced by the catalyzed reaction between hydrogen and an oxidizing gas, generally oxygen, either pure or diluted, as in air.

In the first type above, a solid polymeric membrane, capable of passing ions, such as the hydrogen ion, or proton, and molecular water, but not the hydrogen or oxygen gases, is used to separate the two gases in anode and cathode chambers, respectively. These membranes have been formed from, for example, a sulfonated fluorocarbon polymer sold, for example, under the trademark "Nafion" ® by E.I. Dupont de Nemours, or a more recently developed polymer by the Dow Chemical Corporation. Other suitable materials can be used together with this invention, but which do not form a part of this. A noble metal catalyst, for example platinum, in small quantities, is generally embedded in or located in direct contact with, the polymeric membrane. These catalytic metals also act as the electrodes for the cell. Bipolar current collectors/separators are used to separate adjacent cells and as the means of collecting and transmitting current flow to outside of each cell. These cells are maintained in "stacks" of a plurality of individual power cells in a series, e.g., 20 cells, which then generate the total voltage output. As a general rule, the voltage generated by a power cell varies inversely with the output amperage taken by the load.

The fuel cell stacks, which generate water as a by product from the chemical reaction of hydrogen-containing fuel and an oxygen-containing oxidant, also require the use of water for cooling and for maintaining the integrity of the electrolyte membrane. In many cases, the by-product water is sufficient to maintain the cooling of the system and to provide the needed humidification of the incoming reactant gases to maintain the integrity of the membrane during operation of the fuel cell. Water is carried from the fuel, or hydrogen, side of the membrane, together with the proton, through the membrane and thus tending to dry the anode side of the membrane, ultimately causing cracking of the membrane if additional water is not provided to compensate for such loss.

Generally, it is known to pre-humidify the system by passing the fuel and oxidant gases through humidification cells within the cell stack, or to externally humidify the fuel and oxidant gases. Examples of such systems are shown in commonly owned U.S. Pat. No. 5,047,298, and in an earlier U.S. Pat. No. 4,214,969. With internal humidification, the fuel and oxidant gases are initially passed independently through humidification cells within the cell stack. The gases are there saturated, or almost saturated, with water vapor and then passed, also in parallel, through the individual power cells within the stack.

It has also been previously suggested that in order to most efficiently use a fuel cell stack for vehicular propulsion, the stack should be, preferably, sized so as to provide sufficient power, at a useful voltage, for normal continuing operation, or cruising operation, when utilizing air as the oxidant, and that during peak loads, pure oxygen should be substituted for air as the oxidant. This allows the fuel cell stack to be sized for normal low power/air operation, but also to provide a peak power capacity, at a suitable voltage, significantly greater than for normal operation, and without any complex changes to the system. Such a system is shown in U.S. Pat. No. 4,657,829. In this prior patent, the water generated by operation of the fuel cell is electrolyzed during normal operation by the excess electrical capacity of the fuel cell. The electrolysis results in the generation of hydrogen and oxygen gases, which in turn are stored under pressure for use when required at peak power capacity. Although this system does result in the desired peak power availability, the amount of oxygen which must be stored in order to have adequate peak power capacity is a problem for a vehicle for which minimum design weight is desired.

It is thus an object of the present invention to provide a fuel cell power system for a vehicle with improved peak power capability but with minimized high pressure gas storage requirement. It is yet a further object of the present invention to provide a fuel cell power system utilizing power created during operation of the vehicle and water generated by operation of the fuel cell to generate oxygen and hydrogen for use during peak power intervals, but wherein the effectiveness of the oxidant air is enhanced by enrichment with oxygen so as to reduce the amount of storage capacity required for peak acceleration requirements. It is yet another and further objective of the present invention to provide a fuel cell powered vehicle having improved efficacy during operation. Other objects and advantages will become apparent when considering the following specific description of an example of the invention.

SUMMARY OF THE INVENTION

The present invention provides a system for powering a motor vehicle utilizing a fuel cell which operates on air and hydrogen during constant speed, or cruising, operation, or during deceleration, and which operates on hydrogen and oxygen-enriched air, i.e., up to about 60% oxygen and preferably not less than about 30%, and optimally between about 35 and 45% oxygen, when peak power is required, as for acceleration or for moving uphill. This invention further provides for the electrolysis of water during operation of the vehicle based upon the power generated during deceleration, or braking, of the moving vehicle, and with additional power being provided from the fuel cell, as necessary. It has been found that oxygen-enriched air containing only 40% oxygen by volume provides sufficient power enhancement, at the required voltages, when operating at the low temperatures, i.e., preferably below about 160° F., and the low pressures, i.e, preferably below about 25 psig, of the present invention. This permits sufficiently high peak power output, while more than doubling the effective storage capacity, based upon peak power output time, of pure oxygen without enlarging the storage tank. The oxygen storage tank should maintain oxygen at a pressure of at least about 200 psig, and preferably at least about 400 psig in order to be able to store sufficient mass of oxygen to feed the fuel cell stacks during expected peak load periods.

BRIEF DESCRIPTION OF THE DRAWINGS

A further understanding of the present invention can be obtained by reference to a preferred embodiment set forth in the illustrations of the accompanying drawing. Although the illustrated embodiment is merely exemplary of systems for carrying out the present invention, both the organization and method of operation of the invention, in general, together with further objectives and advantages thereof, may be more easily understood by reference to the drawings and the following description. The drawing is not intended to limit the scope of this invention, which is set forth with particularity in the claims as appended or as subsequently amended, but merely to clarify and exemplify the invention. Referring to the drawing:

DETAILED DESCRIPTION OF THE INVENTION

Figure 1:
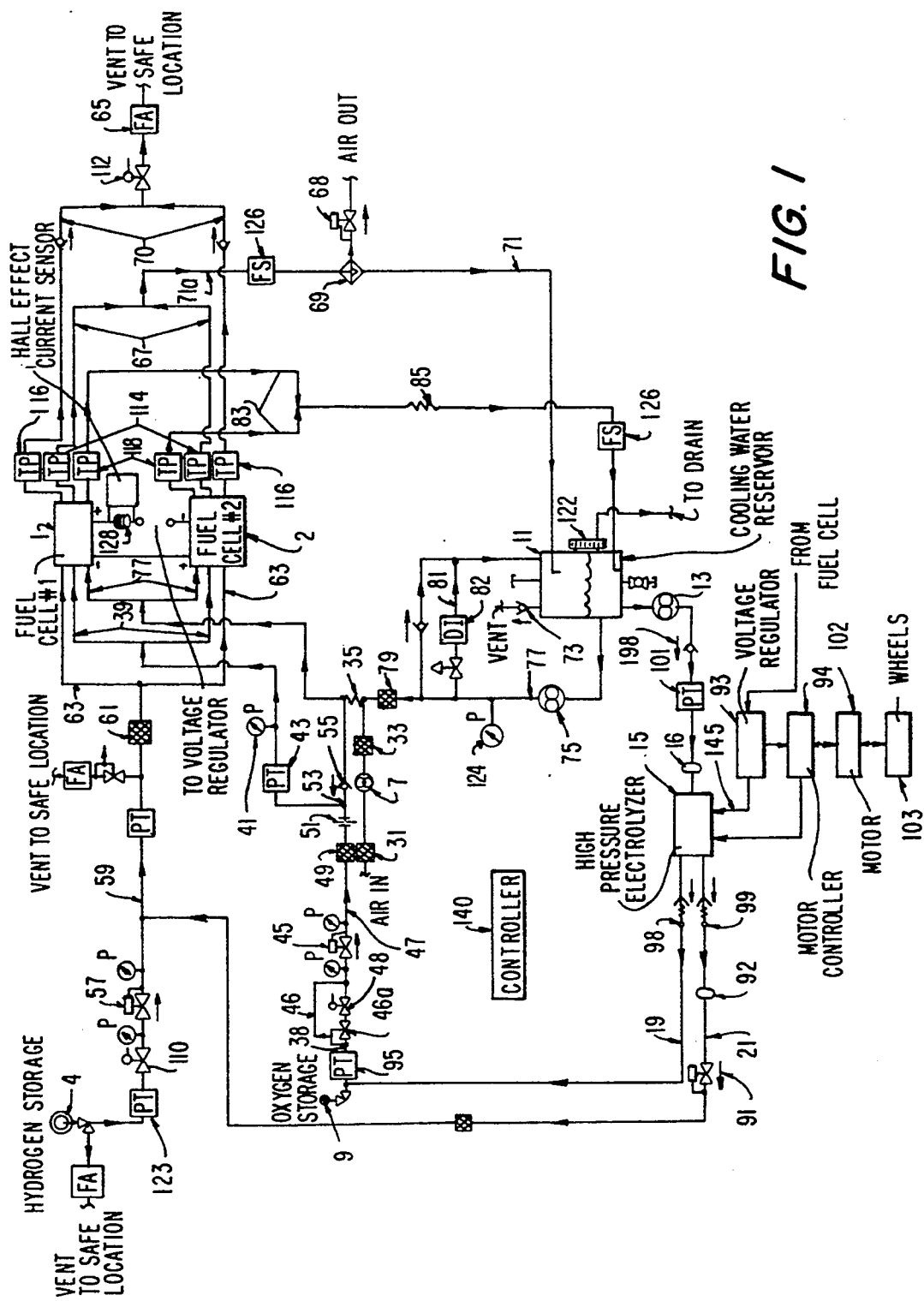
FIG. 1 is an overall schematic diagram of a preferred system in accordance with the present invention.

Referring to the preferred system design shown schematically in FIG. 1, a pair of fuel cell stacks 1,2 receive hydrogen fuel at a desired pressure from a pressurized hydrogen gas storage tank 4 and receive pressurized air from a pressure pump, or centrifugal compressor 7. The output pressurized air from the compressor 7 is optionally enriched with additional pure oxygen, received from an, e.g., 500 psig oxygen storage tank 9, for peak power production by the fuel cell stacks.

By-product water, from the air side of the pair of fuel cell stacks 1,2, is carried by the excess air from the stacks 1,2 through an initial filter separator 69, from which most of the oxygen-lean air, i.e., nitrogen, is vented, through a back pressure regulating valve 68; and the water is then passed to a cooling water reservoir 11, where any remaining air is released and the water is accumulated, and from which the released gas is vented.

A portion of the high purity water from the cooling water reservoir 11 can be reused for cooling and humidifying the fuel cells through a separate water line 77 into the stacks 1,2, and another portion thereof is passed to a high pressure pump 13, by which it is pressurized to preferably, for example, a pressure of greater than about 500 psig, and then fed into an electrolyzer 15, maintained at the elevated pressure.

The gaseous products from the high pressure electrolyzer are at a pressure greater than the pressure in the oxygen storage tank; high pressure oxygen from the electrolyzer can then be passed to the oxygen storage tank 9, without further pressurization or pumping, and the high pressure hydrogen is fed directly to the cells of the stacks 1,2 to supplement, and to help conserve, the stored hydrogen fuel, without regard to whether the oxygen is also immediately used in the fuel cell stacks. The flow of any excess hydrogen can be buffered by the accumulator 92.

The cells in the stacks are electrically connected in series, but mass flow through the cells is in parallel.

In this preferred embodiment, the electrolyzer 15, is powered either by a regenerative braking system or by excess power output from the fuel cell stacks 1,2, available during off-peak load periods. It has been determined that when the vehicle has a motor with 30 kW of generating capacity, as little as 10 seconds of deceleration from, for example, 45 mph to 25 mph, is sufficient to generate 0.5 standard cubic feet of oxygen.

The electrolyzer 15 comprises a plurality of bipolar cells, which are very similar to those in the fuel cell stacks; the cells each comprise anode and cathode chambers separated by an ion-exchange membrane having catalytic electrodes in intimate contact with the membrane. The membrane can be formed from a Nafion ® polymer or another sulfonated fluorocarbon or other suitable material, as described above for the fuel cell stacks.

The cathode chambers of the electrolysis cells receive water from the pump 13 at approximately 500 psig, after passing through an accumulator 16 and being measured by a pressure transducer 101. The hydrogen and oxygen gases generated in the anode and cathode chambers of the electrolyzer, respectively, are then fed into the fuel cell system. The oxygen, passing through a pressure line 19 at a pressure greater than, e.g., 500 psig, passes into the oxygen storage tank 9. The hydrogen from the anode, exiting through line 21, also at pressures greater than, e.g., 500 psig, pass into the hydrogen system and is immediately directed into the fuel cell, to supplement the hydrogen from the storage vessel 4; any slight variations in flow requirements are buffered by the volume in the hydrogen accumulator 92. Any excess water, which is pumped ionically across the membrane with the hydrogen ions, is separated from the gases and preferably discharged. A pressure relief by-pass valve 46 is provided in the flow line from the oxygen storage tank 9 to the fuel cell, to automatically by-pass the closed solenoid valve 48 when the pressurized oxygen storage vessel 9 and line 38 reaches a predetermined pressure above the desired storage level, e.g., 600 psig, to permit the excess electrolyzer oxygen to be admixed with air and fed directly to the fuel cells.

As pointed out above, the present invention provides a fuel cell power system for powering a vehicle, whether an automobile, a truck or a train, where the power is provided by a relatively low pressure, low temperature fuel cell stack which can use air, or oxygen-enriched air for peak power periods, as the oxidizing agent, for a fuel which is preferably hydrogen gas. The fuel cell stack of the present invention is designed to operate at a temperature of anywhere from above the freezing point, e.g., above 35 degrees F., to below the boiling point of water, preferably not greater than about 150 degrees F., and most preferably at a temperature of between about 75 degrees F. and 140 degrees F., but optimally below about 130 degrees F. The pressure in the fuel cell stack is at least about 10 psig, preferably at least about 15 psig and not greater than about 30 psig at the exit from the stack, and most preferably not greater than about 20 psig. Optimally, the stack operates such that the pressure at the exit from the air side of each stack is in the range of between about 15 and 20 psig. It is expected that the pressure drop through the stack on the air side is approximately not greater than about 1.5 psi and usually preferably not greater than about 1 psi.

To achieve the low pressure drop and to attain sufficient gas through-put and thus power output, the cell should be sized such that the linear gas velocity entering the two sides of each fuel cell is preferably not greater than about 100 ft. per second. The mass flow of the gases through the system is of course dependent upon the power required to be generated and the maximum mass flow through the stacks is dependant upon the number of power cells. For example, a normal mass flow for air is in the range of from about 2.0 to about 3.0 lb per minute and the mass flow for hydrogen is in the range of from about 0.04 to about 0.05 lb per minute to obtain a current output of 170 amps at 120 volts DC, from the two stacks, each containing eighty-six power cells.

In this system of FIG. 1, the air passes through an initial filter 31 and then is pressurized by air compressor 7 substantially to the desired pressure for feeding into the fuel cell stacks 1,2. The pressurized air from the compressor 7 is then refiltered in filter 33 and cooled in heat exchanger 35, indirectly, by water and then passes through a check valve 55 and into the fuel cell stacks 1,2 through line 39. It is understood that the heat exchanger 35 may not be necessary for certain conditions. A readable pressure gauge 41 and pressure transducer 43 are provided in line 39 for monitoring and safety purposes.

When oxygen enrichment of the air is required for peak power demand from the fuel cell stacks 1,2, the oxygen solenoid valve 48 is opened and the preadjusted, self regulating pressure regulating valve 45 provides the desired pressure and flow through line 47 and filter 49; the oxygen passes through the flow controlling orifice 51 to admix, at juncture 53, with the pressurized air passing through the check valve 55. The oxygen-enriched air containing, e.g., 40% $O_2$ by volume, then passes through the pressure transducer 43 and into the cathode side of the fuel cell stacks 1,2 via the inlet lines 39 as previously described.

Hydrogen is provided from a pressurized storage bottle 4, the flow and pressure being adjusted by the pressure regulating valve 57, and into the hydrogen manifold line 59; after passing through a hydrogen filter 61, the hydrogen gas at the desired pressure passes into the anode side of the fuel cell stacks 1,2 through the twin feedlines 63. Although under optimal conditions all hydrogen passing into the fuel cell stack through the feedlines 63 is converted to water in the stacks 1,2, any small amount of contaminants concentrated in the remaining hydrogen can at intervals, be flushed out through outlet lines 70 and a flash arrester 65.

The by-product water, formed in the fuel cells in the stacks 1,2 by the oxidation of hydrogen to water, is removed from the cells together with the oxygen-lean air through the air effluent lines 67. The water is passed through a filter separator 69 in the exit manifold 71a, from which most of the air is vented through a suitable back pressure regulating vent valve 68, which maintains the pressure in the system at the desired value; the remaining water, with some remaining air, is drained from the separator 69 through piping 71 and into the cooling water reservoir 11; the remaining air is permitted to exhaust from the reservoir 11, through the pre-set check valved vent 73, which works in concert with the upstream vent valve 68 to maintain the pressure in the reservoir 11 and in the air flow system.

During normal operation of the fuel cell stacks 1,2, water from the reservoir 11 is pumped by a water pump 75 at a pressure sufficient to provide adequate flow through the fuel cell stacks 1,2. The water is passed through line 77 from the pump 75 and then through a filter 79. In addition to filtration, it may, at intervals, be necessary to further deionize the water via the shunt circuit 81, which includes a conventional deionizer 82. The filtered water can then be used to indirectly cool the compressed air in heat exchanger 35 and is then passed to the humidifier cells in the stacks 1,2 and, where desired, also to the cooling sections of the fuel cell stacks 1,2.

The humidification of the two gases, i.e. hydrogen and air (or oxygen) in the fuel cell stacks is a feature known to the art (see commonly owned U.S. Pat. No. 5,047,298), and is not a feature of the present invention. It is sufficient to note that the humidification sections in each fuel cell stack are intended to insure against the drying out of the electrolyte membrane in the power cells. The water from the cooling and humidification sections of the stacks 1,2, is then recycled back to the water reservoir 11 via lines 83, where it is admixed with new by-product water from the power cells in the stacks 1,2. Additional air/water cooling heat exchangers 85 can be provided in line 83 where desired to further cool the water, using air fans, not shown.

During the normal operation of the fuel cell, where the full power output of the normal hydrogen/air fuel cells is not required for propulsion of the vehicle, or, as further explained below, during deceleration of the vehicle, a portion of the water from the reservoir 11 can be passed through the high pressure pump 13, which pressurizes the water up to greater than the electrolyzer pressure, which about equals the storage pressure of the oxygen gas, e.g., usually about 500 psig; the pressurized water is then allowed to flow into the high pressure electrolyzer stack 15. The water is introduced into the cathode chambers of the electrolyzer stack 15. The electrolyzer stack 15 comprises a plurality of electrolyzer cells; each cell is divided into a cathode and an anode chamber by an ion exchange membrane having opposed catalytic electrodes, as described above for the fuel cell. Bipolar current collectors are positioned to separate the anode and cathode chambers of adjacent cells within the stack, also similar to the full cell stacks 1,2; the electrical power for the high pressure electrolyzer 15 is connected through a voltage regulator 93, to the power output electrodes of the fuel cell stacks, or through a control system 94 to a generator-motor, powered by, e.g., a regenerative braking system.

The oxygen generated in the cathode chambers of the electrolyzer stack 15, and the hydrogen transported to the anode sections of the electrolyzer stack 15, are then passed to their respective storage tanks 9,4; the oxygen passes through line 19 to the oxygen storage tank 9, or is directly used to enrich the air feed. When the oxygen storage tank 9 is filled to capacity, as measured by the pressure transducer 95, the oxygen can by-pass the closed solenoid valve 48 when the pre-set, self-regulating pressure relief valve 46a opens the by-pass line 46. This results in more efficient operation of the fuel cell stacks.

The hydrogen gas from the electrolyzer 15 is preferably passed through the line 21 to the hydrogen feedline 59, to be directly and immediately used in the fuel cell stacks 1,2, so as to conserve the hydrogen in the hydrogen storage unit 4. The high pressure hydrogen from the electrolyzer, e.g. at about 500 psig, is passed through an accumulator 92 (which also permits removal of excess water) and then passes through a pressure regulating valve 91, through which the pressure is dropped to slightly above that for the hydrogen passing from the storage pressure regulating valve 57; this permits the electrolysis hydrogen to be preferentially used in the fuel cell stacks 1,2, in the place of the hydrogen in the storage tank 4.

The pressure of the gases and the liquids in the fuel cell stacks should be maintained at the desired relatively low levels throughout the operating cycle of the fuel cells. The pre-set pressure regulating exhaust valves 68,73 in the air system, together with the controls in the inlet lines to the fuel cell stacks cooperate to maintain the desired pressures.

Similarly, the low temperatures desired for operating the fuel cell stacks are maintained by the cooling water flow as well as by controlling the inlet temperatures of the fuel and oxidant gases, e.g., hydrogen and air, or oxygen-enriched air. The desired high pressure in the electrolyzer can be maintained during the periods of time that it is not powered, by the pre-set, spring-loaded flow control valves 98,99 located, respectively, in the oxygen and hydrogen outlet lines 19,21 from the electrolyzer 15, and the check valve 198 located upstream of the electrolyzer 15. These flow control valves 98,99 are held closed by their springs until such time as the pressure differential across each valve is sufficient to overcome the spring force, e.g., about 20 psi.

The structures of the fuel cells, the humidification cells in the stacks 1,2 and the structures of the electrolysis cells in the electrolyzer 15 are not in detail a part of this invention. Examples of suitable such cells are shown, for example, in U.S. Pat. Nos. 4,214,969, 4,210,512, 3,432,355, 3,392,058, 3,297,484 and 3,134,697.

The regenerative braking power supply system, comprising the vehicle wheels 103, the drive motor/generator 102, and the motor controller 94, itself is well known to the art and is not a feature of the present invention. Examples of suitable electrical systems utilizing regenerative braking to supply power to recharge an electrical source are shown, for example, in U.S. Pat. Nos. 5,064,013, 4,951,769, and 4,908,553. Although these systems do not include an electrolyzer, the connection for providing direct current to the electrolyzer 15 can readily be made in the same manner as for charging a storage battery, or other direct current load, as shown, as a preferred example, by the electric motor generator system described in U.S. Pat. No. 4,951,769. As shown in that patent, the motor can be operated as a generator during regenerative braking; alternatively, but less preferred, a separate generator can be provided.

Figure 2:
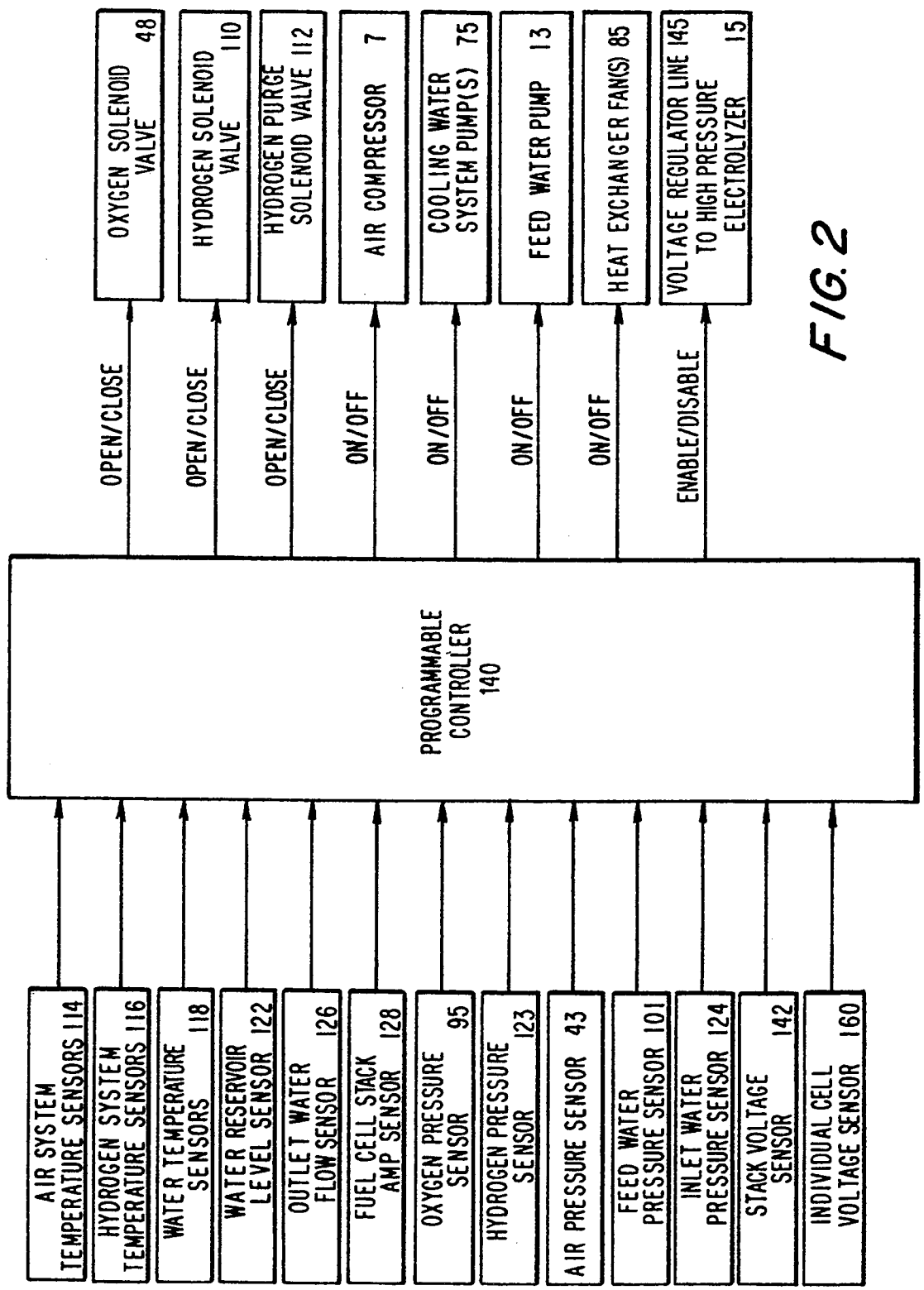
FIG. 2 is a diagrammatic function chart for the electronic programmable controller for the fuel cell power system for a land vehicle of the present invention.

Overall control over the fuel cell power system is maintained preferably by a programmable controller 140. The controller 140 receives input signals from sensors located at significant locations in the system, and by integrating the information provided by the various signals, can control the operating functions of the system. Referring to FIG. 2, the programmable controller receives input signals from the temperature probes 114, 116 and 118 located in the exit lines from the air and hydrogen sides and the cooling water system of the fuel cell stacks 1,2. In the cooling and by-product water system, the controller 140 also monitors the water level in the reservoir 11, by sensor 122 and the water flow rate from the stacks, by flow sensor 126.

The oxygen and hydrogen gas storage pressures are measured by the pressure transducers 95,123 respectively, and the air feed pressure into the stacks is measured by the transducer 43 in the manifold line 39. The cooling and humidification water inlet pressure into the stacks is measured by the pressure gauge 124.

The electrical output from the stacks is measured by the fuel cell stack amp sensor 128 and an overall stack voltage sensor, not shown; there is also provided an individual cell voltage sensor for each power cell in the stacks 1,2, also not shown in FIG. 1.

Figure 3:
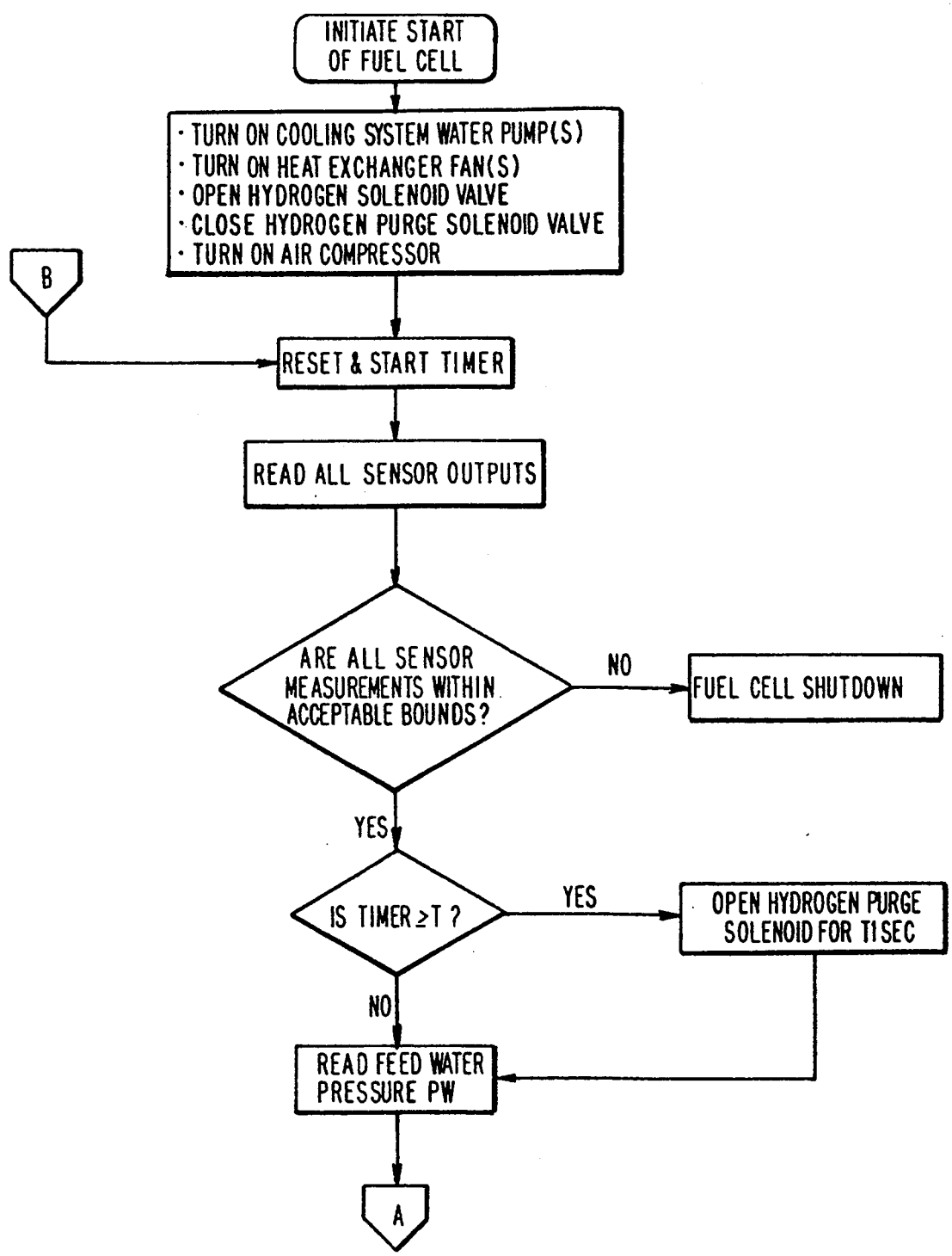
FIG. 3 is a top level logic flow diagram for the operation of the programmable controller of FIG. 2.

The system shown in FIG. 1 is controlled by the programmable controller 140 programmed in accordance with the top level logic flow diagram of FIG. 3. As shown by the logic diagram, initiating startup of the system results in signals being sent to open the hydrogen solenoid valve 110, and to turn on the cooling system water pump 75, the heat exchanger fans 85, and the air compressor 7. Once started up, the controller signals to open or close the oxygen solenoid valve 48, to enrich the air flow to the stacks; to open and close the hydrogen purge solenoid valve 112, at predefined intervals, to prevent the buildup of impurities in the hydrogen side of the stacks 1,2; and to close down the entire system if the various sensor measurements are outside of predetermined bounds, such as excessive temperatures or pressures in the stacks.

The programmable controller 140 also controls the operation of the electrolyzer 15 and its interaction with the fuel cell stacks and its supply system. The electrolyzer 15 provides oxygen gas to refill the oxygen storage unit during cruising or, when the storage unit is full, to improve efficiency of fuel cell stack operation during deceleration, and concurrently to provide additional hydrogen gas feed to the stacks 1,2 during that period. The electrical power output from the stacks 1,2 is all sent to the voltage regulator 93, from which it is distributed, at substantially constant voltage, to the electrolyzer 15 and/or to the motor 102, via the motor controller 94, for driving the wheels of the vehicle. The voltage regulator 93 is required because of the well-known variation in the output voltage from the fuel cell stacks 1,2 with change in the output current. The circuit 145 from the voltage regulator 93 to the electrolyzer 15 is preferably closed only when the oxygen storage tank 9 requires filling and the vehicle is not accelerating or going uphill; at all other times that circuit is open so that power from the fuel cell stacks 1,2 is not used for electrolysis.

The feed water pump 13, for feeding water at high pressure to the accumulator 16, is controlled directy by the programmable controller 140 when the entire system is turned on or off. The pump 13 is turned on or off in response to a signal from the transducer 101, which measures the pressure in the accumulator 16. The flow of water to the electrolyzer 15 is passively controlled by the pressure differential between the accumulator 16 and the electrolyzer 15, in parallel with the closing and opening of the power circuits to the electrolyzer, either through the voltage regulator 93, or the motor controller 94.

A pressure transducer 95, located adjacent the oxygen storage tank 9, provides a signal to the controller 140 when the tank pressure falls below the value when the tank is "full". The controller 140 is programmed to permit the closing of the circuit between the voltage regulator 93 and the electrolyzer 15, but only if the voltage sensors 160,142 indicate that the power load on the fuel cells is not at or above the maximum for operation with air; this permits the use of excess fuel cell power to operate the electrolyzer 15 until the oxygen storage tank 9 has reached the desired pressure value indicating "full". Similarly, if the oxygen tank 9 is full and there is no power being generated, by the regenerative braking system 103,102,94, to the electrolyzer 15, as signaled by an increase in feed water pressure measured by the transducer 101, a signal is sent to shut down the feed water pressure pump 13. A pair of check valves 98,99 serve to prevent reverse flow of gases into the electrolyzer 15, from the high pressure storage tanks 4,9, while maintaining the high pressure in the electrolyzer 15 in concert with the feed pump 13. It must be noted that the feed pump 13 acts as a valve when it is not operating, to seal off the reservoir 11 from the electrolyzer 15. Alternatively, the feed pump 13 can be turned on by the controller 140 in response to current being drawn by the electrolysis cell stack 15 by the operation of the regenerative braking system.

When the fuel cell amp sensor 128 indicates that the power being drawn by the motor is above the desired maximum for hydrogen/air operation, the controller 140 is programmed to enrich the air flow to the fuel cell stack by the addition of pure oxygen from storage tank 9: the solenoid valve 48 is opened, causing the pressurized oxygen to flow through line 47, to the pressure regulating valve 45, where the pressure is dropped to slightly above that of the compressed air pressure from the heat exchanger 35, and through the flow controlling orifice 51, to be admixed with the compressed air at junction 53. The flow control orifice 51 is designed to provide the required amount of oxygen to be admixed with the compressed air to form the desired enrichment of the air. Such an orifice design for the precise metering of gas flow is well-known, based upon the quantity and pressure drop required for the oxygen. The orifice can also be variable, as with a needle valve; thus, permitting variation in the extent of the enrichment as required for the fuel cell stacks.

The switching of the solenoid valve 48 can also be accomplished, for example, by directly, electromechanically mechanically, opening the valve as a result of a signal received, for example, from the accelerator control of the vehicle, e.g. an accelerator pedal.

Consumption of the oxygen from pressure vessel 9 ultimately results in the tank pressure falling to below the minimum level, which again automatically provides a signal from pressure transducer 95 to reactivate the power to the electrolyzer 15 and to the high pressure pump 13 as soon as the peak power demand on the fuel cell stacks 1,2 is discontinued. Water from the reservoir 11 is then passed into the high pressure electrolyzer 15, and hydrogen and oxygen gases are again produced, until the oxygen pressure in the storage tank 9 is increased to the desired pressure level.

It is recognized that there is a continuing load on the fuel cell system, even during idling or deceleration, to maintain its own operations, including for example, the powering of the various pumps, fans and control elements; this usage is generally referred to as the "hotel load".

What is claimed is:

1. A fuel cell power system for a vehicle comprising a fuel cell stack designed to operate using hydrogen gas as fuel and air as the oxidant during periods of normal power output, the system comprising the fuel cell stack; means for providing hydrogen under pressure to the fuel cell; and air means for supplying pressurized air as an oxidant gas for the fuel cell stack; wherein the improvement comprises: the fuel cell stack being designed to operate at a pressure of not more than about 30 psig above atmospheric pressure, and at a temperature below the boiling point of water at ambient pressure, and further comprising elevated pressure oxygen storage means to store substantially pure oxygen under elevated pressure; valve means in fluid flow connection between the oxygen storage means and the air means, and means responsive to an amperage output from the fuel cell stack above a set level, for opening the valve so as to add pure oxygen to the supply of pressurized air fed to the fuel cell stack, to enrich the air fed to the fuel cell stack to contain at least 30% but not more than 60% oxygen by volume during periods when the amperage output is above a set level.

2. The fuel cell power system of claim 1, further comprising an electrolyzer for electrolyzing water to produce hydrogen and oxygen; means to supply an electrolysis current to the electrolyzer; and conduit means to carry the oxygen from the electrolyzer to the elevated pressure storage means.

3. The fuel cell power system of claim 2, wherein the vehicle is a land vehicle comprising wheels, and wherein the means to supply an electrolysis current to the electrolyzer, comprises regenerative braking power means mechanically connected to the wheels of the vehicle and electrically connected to the electrolyzer.

4. The fuel cell power system of claim 3, further comprising electrical control means electrically connected between the fuel cell stack and the electrolyzer and designed to supply current from the fuel cell stack when power demand for operating the vehicle is below a set level.

5. The fuel cell power system of claim 2, comprising a water reservoir in fluid flow connection between the fuel cell stack and the electrolyzer, and a pressure pump for pressurizing water from the reservoir and feeding the pressurized water to the electrolyzer at a pressure greater than that in the oxygen storage means.

6. The fuel cell power system of claim 2, wherein the electrolyzer is operated at a pressure of at least about 200 psig.

7. The fuel cell power system of claim 2, further comprising means to feed the hydrogen generated by the electrolyzer during normal power operation of the fuel cell stack directly back to the fuel cell stack.

8. The fuel cell power system of claim 1, wherein the fuel cell stack is designed to operate at a temperature in the range of from about 75° to about 130° F.

9. The fuel cell power system of claim 8, wherein the fuel cell stack is designed to operate at a pressure of from about 15 to about 25 psig.

10. The fuel cell power system of claim 1, wherein the fuel cell stack comprises an air inlet and an air outlet, and wherein the air passing through the fuel cell stack is subject to a pressure drop between the inlet and outlet, and wherein the fuel cell stack is designed to operate such that at maximum power for air, the pressure drop for air between the inlet to and the outlet from the stack is not greater than about 1.5 psi.

11. The fuel cell power system of claim 1, wherein the system is so designed that the air feed to the fuel cell stack is enriched to not more than about 50% oxygen by volume.

12. The fuel cell power system of claim 1, wherein air is pressurized in compressor means powered by electricity from the fuel cell stack to a pressure in the range of between about 15 and 20 psig, and the pressurized air from the pump is then cooled before being fed to the fuel cell stack.

13. The fuel cell power system of claim 12, wherein the pure oxygen gas admixed with the pressurized air is initially stored at a pressure of at least about 200 psig and is expanded upon admixing with the pressurized air.

14. The fuel cell power system for a vehicle comprising a fuel cell stack which is operated by hydrogen gas fuel and air during normal power intervals and oxygen enriched air to contain at least 30% but not more than 60% oxygen by volume during peak power intervals, a fuel cell stack having a plurality of cells, each cell comprising an anode and a cathode separated by an ion-exchange membrane; means for providing hydrogen under pressure to the fuel cell stack; means for supplying air under pressure as an oxidant gas for the fuel cell stack; the fuel cell stack is designed to operate at an increased pressure of not more than about 30 psig and at a temperature below the boiling point of water at ambient pressure; and an electrolyzer for electrolyzing water to produce hydrogen and oxygen; means to supply an electrolysis current to the electrolyzer; conduit means to carry the oxygen from the electrolyzer to the elevated pressure storage means; a water reservoir in fluid flow connection between the fuel cell stack and the electrolyzer; and a pressure pump for pressurizing water from the reservoir and feeding the pressurized water to the electrolizer at a pressure greater than that in the oxygen storage means.

15. The fuel cell power system of claim 14, wherein the fuel cell stack is designed to operate at a temperature in the range of from about 75° to about 130° F. and at a pressure of from about 15 to about 25 psig.

16. In a process for galvanically generating electricity, the process comprising separately passing hydrogen gas and air through a stack of ion-exchange membrane fuel cells, to generate electrical current and by-product water, and removing the by-product water; wherein the improvement comprises feeding the air and hydrogen gas to the fuel cell stack at a pressure of not greater than about 30 psig and at a temperature below the ambient boiling point of water, and further providing pure oxygen gas which is admixed with the air fed to the fuel cell stack so that oxygen enriched air is fed to the fuel cell stack when the amperage output from the fuel cell stack is above a set level, wherein the proportion of oxygen in the oxygen enriched air is not greater than about 60% but not less than about 30% by volume.

17. The process of claim 16, further comprising pressurizing the by-product water to a pressure of at least about 200 psig, electrolyzing the by-product water to form hydrogen and oxygen gases to be recycled back to the fuel cell stack.

18. The process of claim 17, wherein the electrical power for electrolyzing the by-product water is generated at least in part by regenerative braking.

19. The process of claim 18, wherein at least a portion of the power for electrolyzing the by-product water is provided from the fuel cell stack when operating at below set power level.

* * * * *